(12) United States Patent
Kerr et al.

(10) Patent No.: US 9,455,451 B2
(45) Date of Patent: Sep. 27, 2016

(54) MEMBRANE-ELECTRODE STRUCTURES FOR MOLECULAR CATALYSTS FOR USE IN FUEL CELLS AND OTHER ELECTROCHEMICAL DEVICES

(71) Applicants: John B. Kerr, Oakland, CA (US); Xiaobing Zhu, Albany, CA (US); Gi Suk Hwang, Albany, CA (US); Zulima Martin, Berkeley, CA (US); Qinggang He, Culver City, CA (US); Peter Driscoll, Methuen, MA (US); Adam Weber, Pleasant Hill, CA (US); Kyle Clark, Oakland, CA (US)

(72) Inventors: John B. Kerr, Oakland, CA (US); Xiaobing Zhu, Albany, CA (US); Gi Suk Hwang, Albany, CA (US); Zulima Martin, Berkeley, CA (US); Qinggang He, Culver City, CA (US); Peter Driscoll, Methuen, MA (US); Adam Weber, Pleasant Hill, CA (US); Kyle Clark, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 101 days.

(21) Appl. No.: 14/052,576

(22) Filed: Oct. 11, 2013

(65) Prior Publication Data
US 2014/0106255 A1   Apr. 17, 2014

Related U.S. Application Data

(60) Provisional application No. 61/713,451, filed on Oct. 12, 2012.

(51) Int. Cl.
*H01M 4/86*   (2006.01)
*H01M 4/90*   (2006.01)
(Continued)

(52) U.S. Cl.
CPC ......... *H01M 4/8668* (2013.01); *H01M 4/9008* (2013.01); *H01M 4/9083* (2013.01); *H01M 4/9041* (2013.01); *H01M 2004/028* (2013.01); *H01M 2008/1095* (2013.01); *Y02E 60/50* (2013.01)

(58) Field of Classification Search
CPC ........... H01M 4/8668; H01M 4/9008; H01M 4/9083; H01M 4/9041; H01M 2004/028; H01M 2008/1095; Y02E 60/50
USPC ........................................... 521/27; 429/482
See application file for complete search history.

(56) References Cited

PUBLICATIONS

He et al. "Molecular catalysis of the oxygen reduction reaction by iron porphyrin catalysts tethered into Nafion layers: An electrochemical study in solution and a membrane-electrode-assembly study in fuel cells", Journal of Power Sources, 216 (2012) 67-75, www.elsevier.com/locate/jpowsour.*

(Continued)

*Primary Examiner* — Michael M Bernshteyn
(74) *Attorney, Agent, or Firm* — Lawrence Berkeley National Laboratory

(57) ABSTRACT

Water soluble catalysts, (M)meso-tetra(N-Methyl-4-Pyridyl)Porphinepentachloride (M=Fe, Co, Mn & Cu), have been incorporated into the polymer binder of oxygen reduction cathodes in membrane electrode assemblies used in PEM fuel cells and found to support encouragingly high current densities. The voltages achieved are low compared to commercial platinum catalysts but entirely consistent with the behavior observed in electroanalytical measurements of the homogeneous catalysts. A model of the dynamics of the electrode action has been developed and validated and this allows the MEA electrodes to be optimized for any chemistry that has been demonstrated in solution. It has been shown that improvements to the performance will come from modifications to the structure of the catalyst combined with optimization of the electrode structure and a well-founded pathway to practical non-platinum group metal catalysts exists.

4 Claims, 11 Drawing Sheets

(51) Int. Cl.
H01M 4/02 (2006.01)
H01M 8/10 (2016.01)

(56) References Cited

PUBLICATIONS

Zhu et al. "Bridge to Fuel Cell Molecular Catalysis: 3D non-Platinum Group Metal Catalyst in MEAs", ECS Transactions, 45 (2) 143-152 (2012).*
He et al. "Electrochemical and spectroscopic study of novel Cu and Fe-based catalysts for oxygen reduction in alkaline media", Journal of Power Sources 213 (2012), 169-179.*
He et al. "Electrochemical and spectroscopic study of novel Cu and Fe-based catalysts for oxygen reduction in alkaline media", Journal of Power Sources, 213 (2012), 169-179.*
He et. al., "Electrochemical and spectroscopic study of novel Cu and Fe-based catalysts for oxygen reduction in alkaline media", Journal of Power Sources, vol. 213, pp. 169-179, (2012).
He et al., "Molecular catalysis of the oxygen reduction reaction by iron porphyrin catalysts tethered into Nation layers: An electrochemical study in solution and a membrane-electrode-assembly study in fuel cells", Journal of Power Sources, vol. 216, pp. 67-75, (2012).
Zhu et. al. "Bridge to Fuel Cell Molecular Catalysis: 3D non-Platinum Group Metal Catalyst in MEAs", ECS Transactions, vol. 45, No. 2, pp. 143-152, (2012).
Savadogo, "Emerging membranes for electrochemical systems: (1) solid polymer electrolyte membranes for fuel cell systems", Journal of New Materials for Electrochemical System, vol. 1, pp. 47-66 (1998).
Steele et. al., "Materials for fuel-cell technologies", Nature, vol. 414, pp. 345-352, (Nov. 15, 2001).
Zhu et. al. "An Ultrathin Self-Humidifying Membrane for PEM Fuel Cell Application: Fabrication, Characterization, and Experimental Analysis", The Journal of Physical Chemistry B, vol. 110, No. 29, pp. 14240-14248, (Jul. 6, 2006).
Qi et. al., "Low Pt loading high performance cathodes for PEM fuel cells", Journal of Power Sources, vol. 113, pp. 37-43, (2003).
Andrieux et. al., "Catalysis of Electrochemical Reactions at Redox Polymer Electrodes", Journal of Electroanalytical Chemistry and Interfacial Electrochemistry, vol. 114, Issue 1, pp. 159-163, (Nov. 10, 1980).
Andrieux et. al., "Heterogeneous (Chemically Modified Electrodes, Polymer Electrodes) vs. Homogeneous Catalysis of Electrochemical Reactions", Journal of Electroanalytical Chemistry and Interfacial Electrochemistry, vol. 93, No. 2, pp. 163-168, (Oct. 25, 1978).
Andrieux et. al. "Homogeneous RedOx Catalysis of Electrochemical Reactions Part I. Introduction", Journal of Electroanalytical Chemistry and Interfacial Electrochemistry, vol. 87, Issue 1, pp. 39-53, (Feb. 10, 1978).
Andrieux et. al. "Homogeneous Redox Catalysis of Electrochemical Reactions Part II. Rate Determining Electron Transfer. Evaluation of Rate and Equilibrium Parameters", Journal of Electroanalytical Chemistry and Interfacial Electrochemistry, vol. 87, Issue 1, pp. 55-65, (Feb. 10, 1978).
Andrieux et. al. "Homogeneous Redox Catalysis of Electrochemical Reactions Part III. Rate Determining Electron Transfer. Kinetic Characterization of Follow-Up Chemical Reactions", Journal of Electroanalytical Chemistry and Interfacial Electrochemistry, vol. 88, Issue 1, pp. 43-48, (Mar. 22, 1978).
Saveant, "Molecular Catalysis of Electrochemical Reactions. Mechanistic Aspects", Chemical Review, vol. 108, No. 1, pp. 2348-2378, (Jul. 11, 2008).
Blauch et. al., "Dynamics of Electron Hopping in Assemblies of Redox Centers. Percolation and Diffusion", Journal of the American Chemical Society, vol. 114, No. 9, pp. 3323-3332, (Apr. 1992).
Gennaro et. al., "Homogeneous Electron Transfer Catalysis of the Electrochemical Reduction of Carbon Dioxide. Do Aromatic Anion Radicals React in an Outer-Sphere Manner?" Journal of the American Chemical Society, vol. 118, pp. 7190-7196, (1996).
Kerr et. al., "A Poly-p-nitrostyrene on Platinum Electrode. Polymer Charging Kinetics and Electrocatalysis of Organic Dihalide Reductions", Journal of the American Chemical Society, vol. 102, No. 10, pp. 3383-3390, (May 7, 1980).
Siroma et. al., "Depression of proton conductivity in recast Nafion® film measured on flat substrate", Journal of Power Sources, vol. 189, Issue 2, pp. 994-998, (Apr. 15, 2009).
Marr et. al., "Composition and performance modelling of catalyst layer in a proton exchange membrane fuel cell", Journal of Power Sources, vol. 77, Issue 1, pp. 17-27, (Jan. 1, 1999).
Yoon et. al., "Modeling Low-Platinum-Loading Effects in Fuel-Cell Catalyst Layers", Journal of the Electrochemical Society, vol. 158, No. 8, pp. B1007-B1018, (2011).
Haug et. al., "Oxygen Diffusion Coefficient and Solubility in a New Proton Exchange Membrane", Journal of the Electrochemical Society, vol. 147, No. 3, pp. 980-930, (2000).
Parthasarathy et. al., "Temperature Dependence of the Electrode Kinetics of Oxygen Reduction at the Platinum/Nation | Interface—A Microelectrode Investigation", Journal of the Electrochemical Society, vol. 139, No. 9, pp. 2530-2537, (1992).
Eikerling et. al., "Modelling the performance of the cathode catalyst layer of polymer electrolyte fuel cells", Journal of Electroanalytical Chemistry, vol. 453, Issues 1-2, pp. 89-106, (Aug. 14, 1998).
Kaviany, Principles of Heat Transfer in Porous Media, Springer-Verlag, New York, NY (1995).
Mezedur et. al., "Effect of Pore Structure, Randomness and Size on Effective Mass Diffusivity", AIChE Journal, vol. 48, No. 1, pp. 15-24, (Jan. 2002).
Nam et. al., "Effective diffusivity and water-saturation distribution in single- and two-layer PEMFC diffusion medium", International Journal of Heat and Mass Transfer, vol. 46, Issue 24, pp. 4595-4611, (Nov. 2003).
Weber el. al., "Modeling gas-phase flow in porous mediaB", International Communications in Heat and Mass Transfer, vol. 32, Issue 7, pp. 855-860, (Jul. 2005).

* cited by examiner

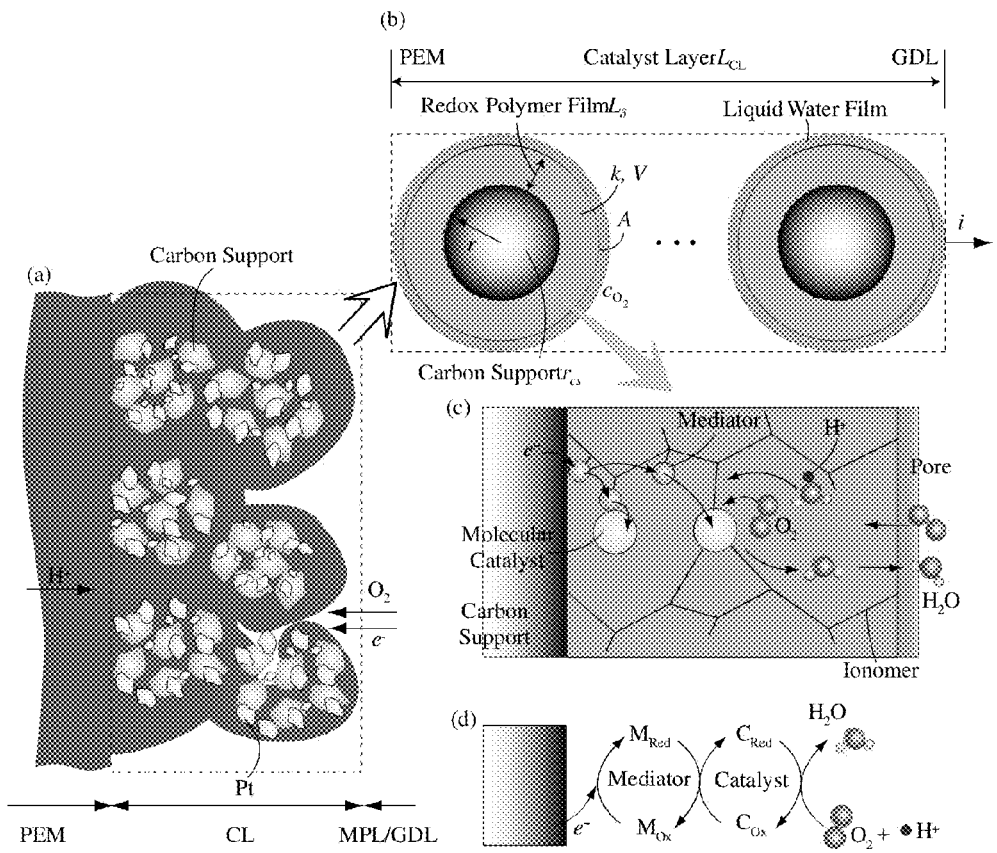
Figure 1(a-d) illustrates a schematic of the multiscale, three-dimensional redox-polymer-coated electrode and molecular catalyst in the cathode catalyst layer. Also illustrated is the mediator mechanism within the redox polymer.

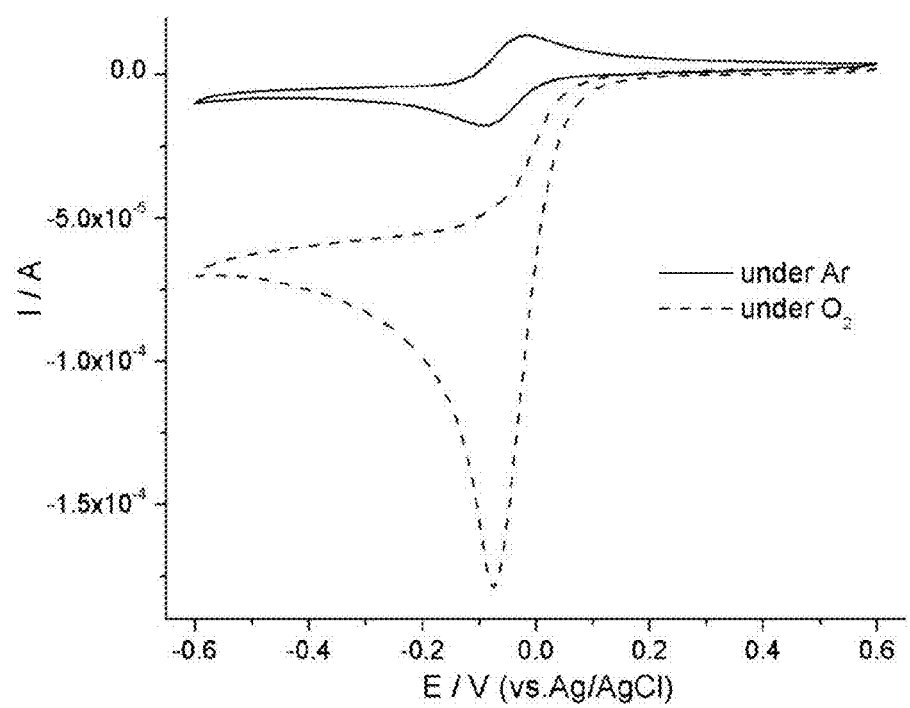
Figure 2 illustrates cyclic voltammograms on a glassy carbon electrode in 0.1M HTf/water containing 0.8 mM Fe(III)TMPyP in the presence and absence of O2, scan rate = 50mV/s.

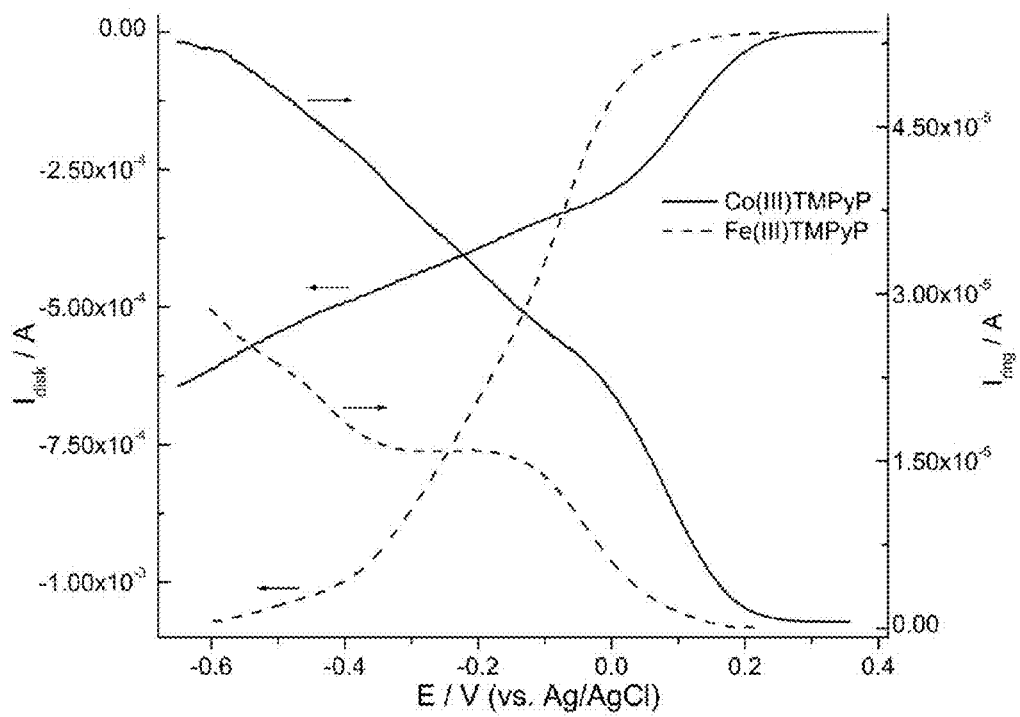
Figure 3 illustrates a polarization curves for the disk and ring electrodes for O2 saturated 0.1M Htf + 0.8 mM Fe(III)TMPyP and 0.1M HTf + 0.8 mM Co(III)TMPyP, rotation speed: 400 rpm, scan rate: 20mV/s

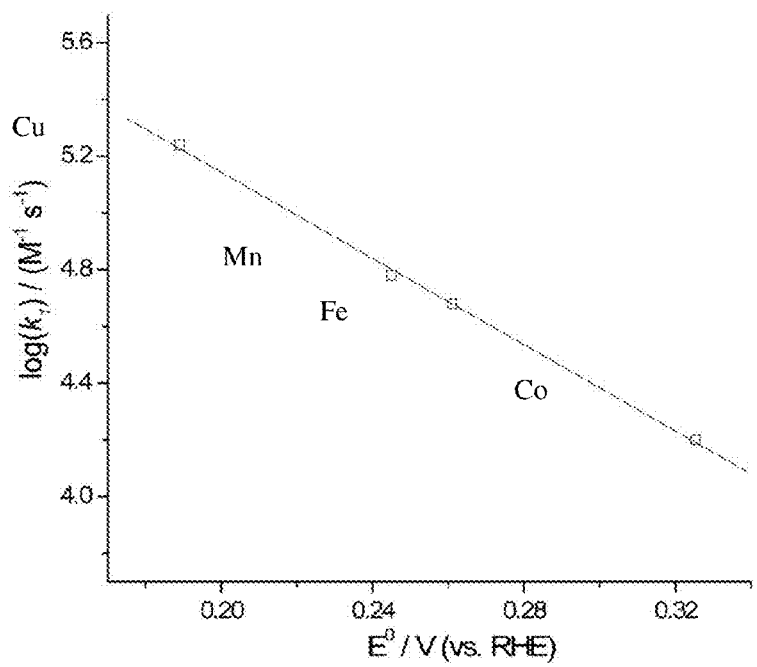
Figure 4 illustrates a logarithm of the rate constant, $k_1$, of the reaction with $O_2$ plotted against, $E^o$, the potential of the complexes composed of (M)TMPyP.

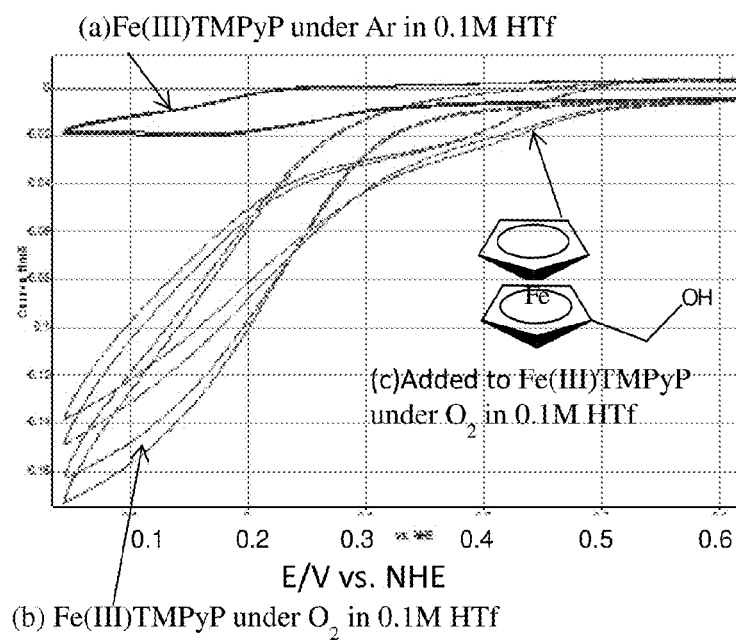
Figure 5 illustrates a cyclic voltammetry at glassy carbon of FeTMPyP(0.5mM) in 0.1M HTf. (a) under Argon; (b) under O2; (c) under O2 with hydroxymethyl ferrocene (0.25 mM) added.

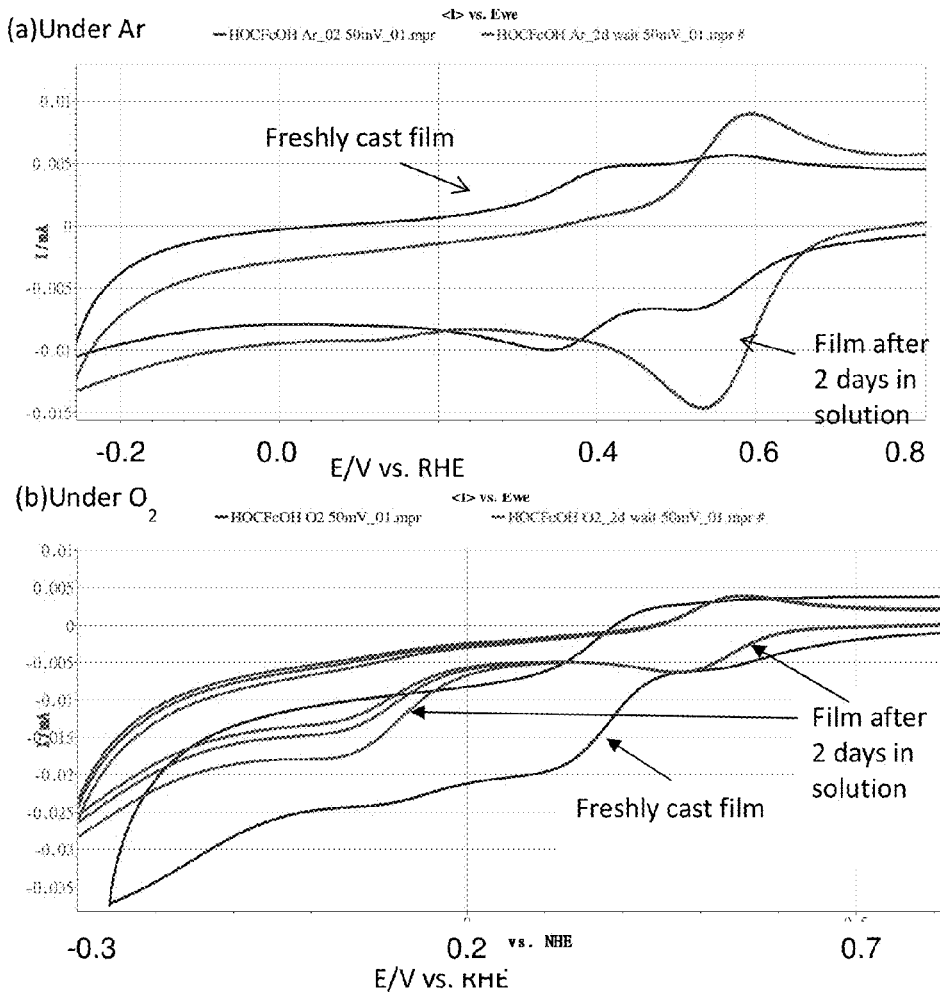
Figure 6 illustrates a cyclic voltammetry of a polymer-coated glassy carbon electrode in 0.1M HTf with the polymer containing Fe(III)TMPyP and Hydroxymethylferrocene. Voltammograms in both (a) argon and (b) O2 for both freshly prepared (blue) and after two day immersion in acid solution (red) electrodes.

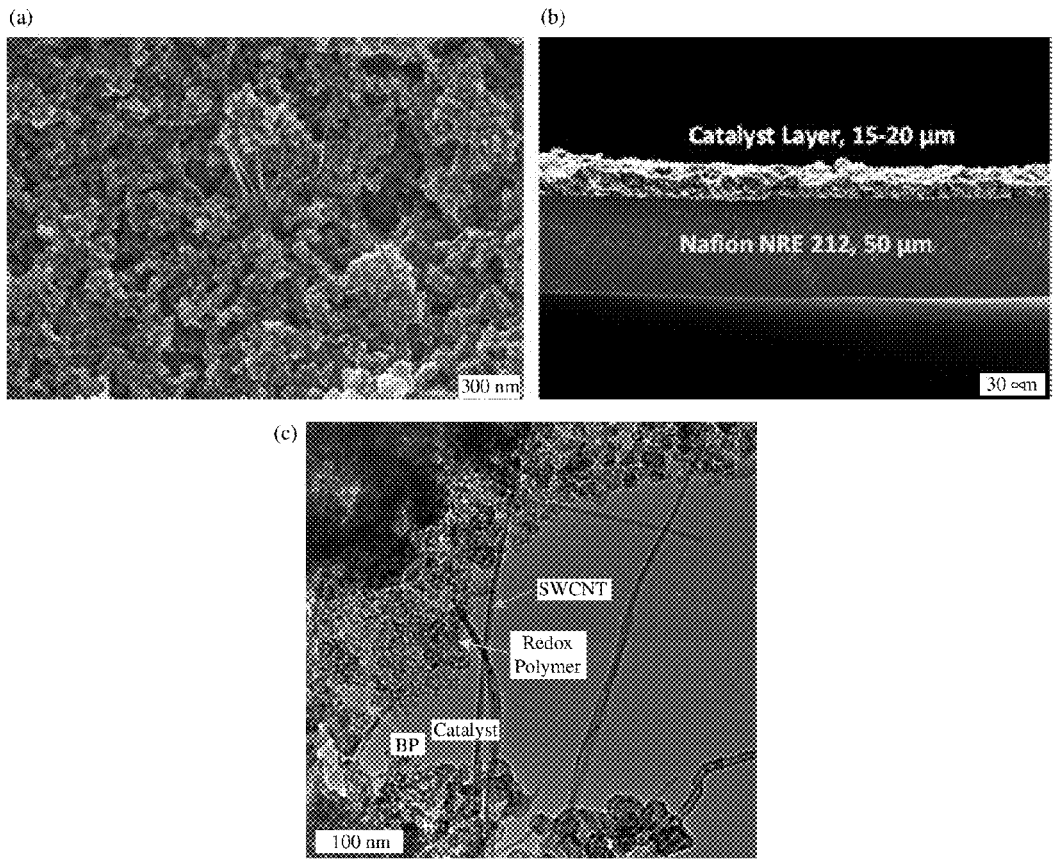

Figure 7 illustrates SEM images of the (a) surface and (b) cross-section of the non-PGM molecular catalyst coated membrane (CoTMPyP Cl5 catalyst with loading of 0.67 mgcat/cm2, and hybrid carbon (BP 2000 plus SWCNT)); the arrows denote the aggregated redox polymer with the black-pearl (BP) carbon particles around the vertically oriented single-walled carbon nanotubes (SWCNT) (c) TEM of the catalyst coating showing molecular catalyst in the redox polymer and carbon support (BP and SWCNT).

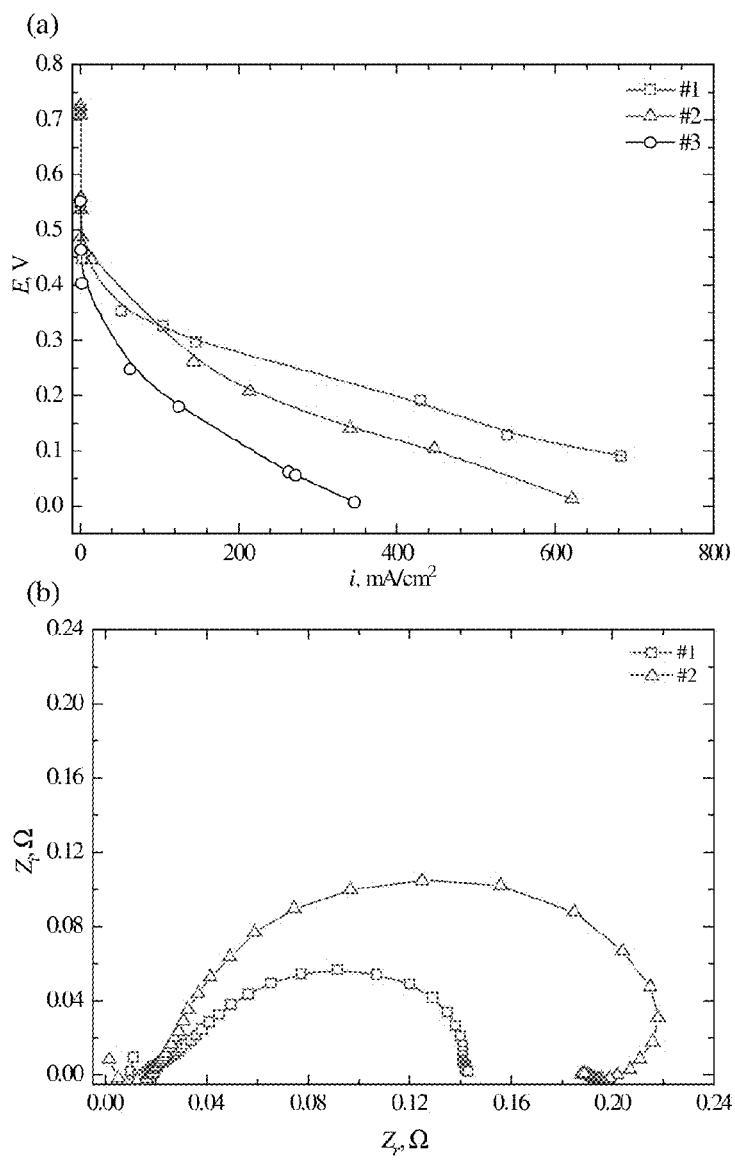
Figure 8 illustrates (a) Fuel-cell polarization curves (H2/O2 at 80°C) with the developed non-PGM molecular catalyst at the cathode with ionomer/carbon mass ratios of 0.6 to 2.4.. (b) Impedance spectra of ionomer/carbon mass ratios of 0.6 and 1.2 at $i$ = 200 mA/cm2.

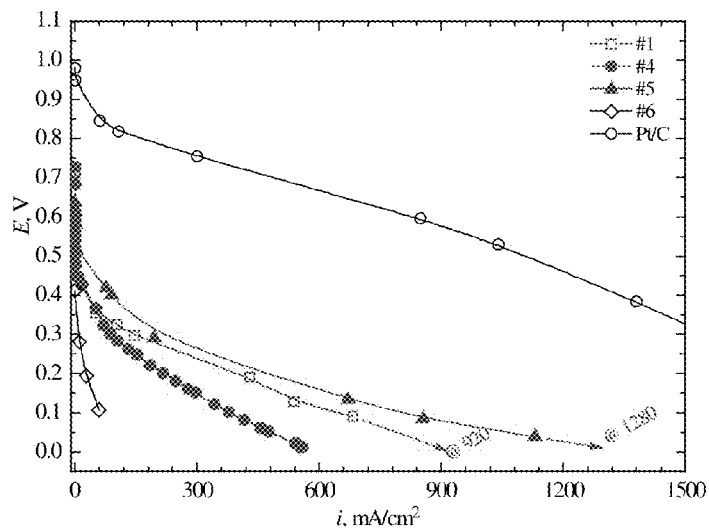

Figure 9 illustrates Fuel-Cell polarization curves for the developed, non-PGM molecular catalyst polymer-coated cathodes with different catalyst loadings and carbon type (samples #1, #4, and #5, see Table I), and commercial Pt/C and blank carbon (Vulcan XC72R, without catalyst and mediator but with Nafion instead of 3M binder) electrodes; all tested in H2/O2 at 80°C. The anticipated maximum current densities are shown for #1 and #5

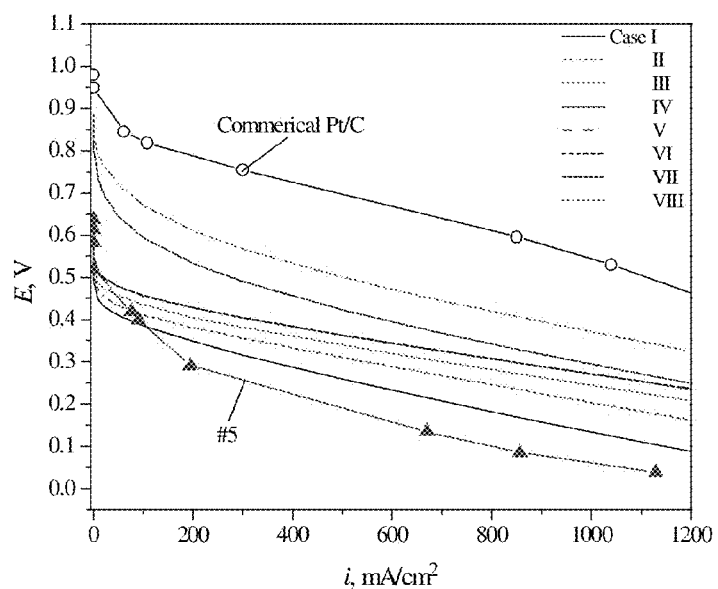
Figure 10 illustrates a predicted performances for incremental design improvements using the optimal geometry, kinetic, and transport parameters. The details of the eight suggested improvements are shown (improvements I to VIII, see Table II), and the measured performance of Pt/C dispersed catalyst is also shown for comparison.

MEMBRANE-ELECTRODE STRUCTURES FOR MOLECULAR CATALYSTS FOR USE IN FUEL CELLS AND OTHER ELECTROCHEMICAL DEVICES

CROSS REFERENCE TO RELATED APPLICATIONS

This application claims priority to U.S. Provisional Application Ser. No. 61/713,451 filed Oct. 12, 2012, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. This material is based upon work supported by the Assistant Secretary for Energy Efficiency and Renewable Energy, Fuel Cell Technologies Program of the U.S. Department of Energy under Contract No. DE-AC02-05CH1123. The government has certain rights in this invention.

BACKGROUND OF THE INVENTION

1. Field of the Invention

The present invention relates to the field of Proton-exchange membrane (PEM) fuel cells.

2. Related Art

Proton-exchange membrane (PEM) fuel cells have attracted attention for both transportation and stationary applications due to their relatively high energy-conversion efficiency and environmental benefits(1-3). For good energy density, storage capability, and mobility convenience, it is still the most promising energy-conversion device, competitive to other techniques such as solar cells and lithium-ion and flow batteries in place of current internal combustion engines, although high manufacturing and material (e.g., Pt) cost, as well as difficulties with the hydrogen infrastructure and delivery impede fuel-cell commercialization. For the latter issues, liquid fuels including methanol or other organic hydrogen carriers are of considerable interest to feed PEM fuel cells and facilitate their commercialization.

BRIEF DESCRIPTION OF THE DRAWINGS

The foregoing aspects and others will be readily appreciated by the skilled artisan from the following description of illustrative embodiments when read in conjunction with the accompanying drawings.

FIG. 1(a-d) illustrates a schematic of the multiscale, three-dimensional redox-polymer-coated electrode and molecular catalyst in the cathode catalyst layer. Also illustrated is the mediator mechanism within the redox polymer.

FIG. 2 illustrates cyclic voltammograms on a glassy carbon electrode in 0.1M HTf/water containing 0.8 mM Fe(III)TMPyP in the presence and absence of $O_2$, scan rate=50 mV/s.

FIG. 3 illustrates a polarization curves for the disk and ring electrodes for $O_2$ saturated 0.1M Htf+0.8 mM Fe(III) TMPyP and 0.1M HTf+0.8 mM Co(III)TMPyP, rotation speed: 400 rpm, scan rate: 20 mV/s.

FIG. 4 illustrates a logarithm of the rate constant, $k_1$, of the reaction with $O_2$ plotted against, $E°$, the potential of the complexes composed of (M)TMPyP.

FIG. 5 illustrates a cyclic voltammetry at glassy carbon of FeTMPyP (0.5 mM) in 0.1M HTf. (a) under Argon; (b) under $O_2$; (c) under $O_2$ with hydroxymethyl ferrocene (0.25 mM) added.

FIG. 6 illustrates a cyclic voltammetry of a polymer-coated glassy carbon electrode in 0.1M HTf with the polymer containing Fe(III)TMPyP and Hydroxymethylferrocene. Voltammograms in both (a) argon and (b) $O_2$ for both freshly prepared (blue) and after two day immersion in acid solution (red) electrodes.

FIG. 7 illustrates SEM images of the (a) surface and (b) cross-section of the non-PGM molecular catalyst coated membrane (CoTMPyP $Cl_5$ catalyst with loading of 0.67 $mg_{cat}/cm^2$, and hybrid carbon (BP 2000 plus SWCNT)); the arrows denote the aggregated redox polymer with the black-pearl (BP) carbon particles around the vertically oriented single-walled carbon nanotubes (SWCNT) (c) TEM of the catalyst coating showing molecular catalyst in the redox polymer and carbon support (BP and SWCNT).

FIG. 8 illustrates (a) Fuel-cell polarization curves ($H_2/O_2$ at 80° C.) with the developed non-PGM molecular catalyst at the cathode with ionomer/carbon mass ratios of 0.6 to 2.4. (b) Impedance spectra of ionomer/carbon mass ratios of 0.6 and 1.2 at i=200 $mA/cm^2$.

FIG. 9 illustrates Fuel-Cell polarization curves for the developed, non-PGM molecular catalyst polymer-coated cathodes with different catalyst loadings and carbon type (samples #1, #4, and #5, see Table I), and commercial Pt/C and blank carbon (Vulcan XC72R, without catalyst and mediator but with Nafion instead of 3M binder) electrodes; all tested in $H_2/O_2$ at 80° C. The anticipated maximum current densities are shown for #1 and #5.

FIG. 10 illustrates a predicted performances for incremental design improvements using the optimal geometry, kinetic, and transport parameters. The details of the eight suggested improvements are shown (improvements I to VIII, see Table II), and the measured performance of Pt/C dispersed catalyst is also shown for comparison.

DETAILED DESCRIPTION

Figure 11:
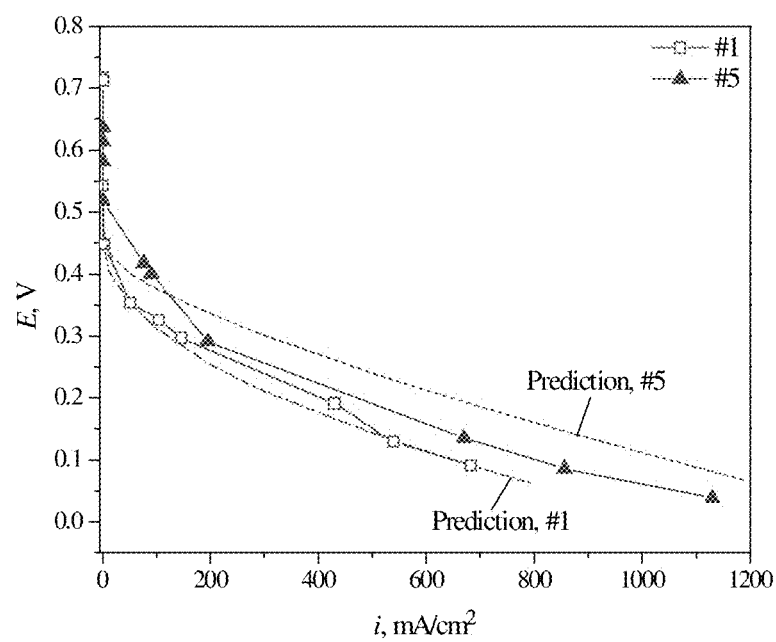
FIG. 11 illustrates a comparison between the experimental and predicted results for the model validation (sample #1 and #5, see Table I).

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Various embodiments of the invention describe the use of homogeneous catalysts in electrochemical devices. This includes oxygen reduction, hydrogen oxidation, dehydrogenation of fuels (e.g. methanol, saturated hetrocyclic com-pounds) hydrogenation of substrates and electrochemical reactions involving carbon-carbon bond formation or cleavage.

The methods developed and described herein provide a way to immobilize the homogeneous catalyst within a polymer layer that is coated on the surface of the electrode support material, typically carbon in fuel cells. This catalyst-polymer layer acts as a binder for the electrode and provides the means to transport electrons, protons, substrates and products to and from the catalysts. The immobilization of the catalysts within a thin layer provides advantages based on local concentrations as well as providing a means to separate the homogeneous catalyst from the products. The work that is disclosed herein was designed to demonstrate that the concept of a 3-dimensionally distributed array of catalysts could function within the electrode layer of a Membrane-electrode assembly (MEA) and provide advantages over the present conventional methods of catalyst use.

An embodiment of the invention is designed to address problems known in the art by providing multiple layers of the catalysts in a 3-dimensional array that provide for higher reaction kinetics due to the 3-d approach of substrates to the surface as well as the ability to stack the catalysts on the electrode surface layer. The electrons are connected to the catalysts by means of electron hopping between redox centers or physical diffusion of redox centers through the polymer layer. These redox centers may be the catalysts themselves or an electron transfer mediator may be used. Use of mediators may allow the electrochemical reactions to occur at more beneficial voltages due to electron transfer redox catalysis. Such catalysis is also very much facilitated by the use of highly concentrated thin layers next to the electrode.

An embodiment of the invention demonstrates that this construction can be used in a gas diffusion electrode solid polymer electrolyte system that is useful for fuel cells and solves many of the separation issues for electrosyntheses. The use of the 3-d array of polymer-tethered catalysts has not been demonstrated previously in MEA systems for fuel cells. The technical problems that were overcome so far involved the incorporation of the catalysts into the MEA inks and the application of the inks to the membranes. The MEAs were then mounted in cells and tested to demonstrate their capability to support high current densities as well as to demonstrate increased lifetime. Redox mediators were used to improve the voltage and the structure of the electrodes were modified to optimize both the redox mediation effect as well as the oxygen reduction catalytic effect. This optimization is still underway and a search guided by molecular modeling is under way to design and synthesize better catalysts and mediators. This is the primary barrier to be overcome for oxygen reduction reactions for fuel cells but the performance appears to be quite satisfactory for a number of reactions such as reduction of C02, oxidation of liquid fuels, etc.

Potential uses of the invention include energy storage and conversion industries—fuel cells, flow batteries; Chemical industry, Pharmaceutical industry, and food industry.

Proton-exchange membrane (PEM) fuel cells have attracted attention for both transportation and stationary applications due to their relatively high energy-conversion efficiency and environmental benefits(1-3). For good energy density, storage capability, and mobility convenience, it is still the most promising energy-conversion device, competitive to other techniques such as solar cells and lithium-ion and flow batteries in place of current internal combustion engines, although high manufacturing and material (e.g., Pt) cost, as well as difficulties with the hydrogen infrastructure and delivery impede fuel-cell commercialization. For the latter issues, liquid fuels including methanol or other organic hydrogen carriers are of considerable interest to feed PEM fuel cells and facilitate their commercialization.

One approach to reduce the cost is to use non platinum group metal (PGM) catalysts that also possess the prospect of better performance than the PGM catalysts. State-of-the-art surface catalysis by noble platinum-based metals has limits, since an increase in Pt-catalyst loading above 0.2 to 0.4 $mg_{Pt}/cm^2$ does not significantly promote further fuel-cell performance at a given catalyst-layer thickness(4). Compared to Pt catalysts on carbon, molecular catalysts such as iron phenanthroline or cobalt porphyrin possess a large footprint, and take up a large area on the surface of the electrode thereby limiting the catalyst site density. This then imposes a need for very high turnover frequencies for the catalyst in order to support fuel-cell current densities. Three-dimensional arrays of catalysts supported by polymer layers on the electrode surface provide a means to increase the site density per unit of surface area without increasing the thickness of the catalyst layer in the membrane-electrode assembly (MEA). Effectively the catalysts are tethered homogeneous catalysts, which possess the advantages of a three-dimensional homogeneous catalyst over a two-dimensional catalyst(5-7). This approach is visualized in FIG. 1.

To make this approach feasible for non-Platinum Group Metal catalysts in MEAs, a couple of main issues need to be solved. First, a suitable catalyst with a high enough turnover frequency has to be identified and also one which remains soluble in the polymer-water medium rather than strongly adsorbed to the carbon surface. Second, one must have a structure that allows for maximum reactant access to the catalyst sites including protons, electrons, and oxygen transport. In one embodiment, we demonstrate the feasibility of the above-mentioned approach (see FIG. 1), and obtain reaction rates comparable with traditional Pt/carbon dispersed MEAs. The molecular catalysis electrode fabrication described herein allows incorporation of water soluble molecular catalysts of M(III) meso-tetra(N-Methyl-4-Pyridyl)Porphine pentachloride (M=Fe, Co, Mn, Cu etc.) into proton-conductive perfluorosulfonic-acid (PFSA) ionomers using mediators to assist electron conduction from the base carbon support to the catalyst sites. Molecular catalysts such as CoTMPyP are tethered to the ionomer through positively charged pyridine groups in the porphyrins that strongly interact with negatively charged sulfonic groups in the ionomer. Consequently, since the catalyst possesses a 5+ charge, the catalytic sites are expected to be nearly immobile within the redox polymer layer. A molecular wire (or redox mediator) is introduced for efficient electron transfer from the carbon surface to the catalyst center (see FIG. 1). In the thin-film redox-polymer, the mediator possesses better mobility as well as the capability to support rapid electron hopping, and the mediators shuttle the electrons from the electron donator (carbon) to the electron acceptor (central metal in porphyrin catalysts). Although this transport raises the possibility of sluggish electron transport within the polymer redox layer(6-9), proton(10), oxygen, and water transport may also be rate limiting in addition to inherently slow kinetics of the catalyst themselves; these tradeoffs are discussed and examined through both experimentation and mathematical modeling. The optimal design structure and incremental improvements for the state-of-the-art catalyst performance are also discussed.

Experimental

Materials

All metalloporphyrins were obtained from Frontier Scientific, Inc. and used as received. All other chemical materials were analytical grade and obtained from Sigma-Aldrich. Black Pearl 2000 carbon powder was obtained from Cobalt Corp., and single walled carbon nanotubes from Shenzhen Nanotech Port Co. Ltd (NTP), China. 3M PFSA ionomer solution of EW 737 g/mol-$SO_3H$ was obtained as a gift from 3M Company. Nafion® NRE212 membrane and SGL 10BC gas diffusion layer (GDL) were obtained from Ion Power Inc., M meso-tetra(N-Methyl-4-Pyridyl)Porphinepentachloride (M=Fe, Co, Mn & Cu), abbreviated as M(III or II)TMPyP were obtained from Frontier Scientific, Inc., Hydroxymethylferrocene and dimethylaminomethyl ferrocene were obtained from Sigma-Aldrich. Solvents for ink preparation (IPA, water, methanol, N-methylpyrrolidinone, dimethylsulfoxide) were purchased from Burdick & Jackson distilled in glass, hplc-grade solvents. The anode Pt/C GDE electrode with 0.3 mg-$_{Pt}$/$cm^2$ and 0.25 mg-$_{Pt}$/$cm^2$ cathode for comparison were obtained from IRD fuel cell technology company.

Voltammetry

Cyclic voltammetry (CV) was carried out using a Biologic VSP bipotentiostat with an ALS RRDE-3 rotating (-ring) disk electrode R(R)DE system with a glassy carbon working electrode and a Pt ring electrode. In general, the voltammetry was carried out in 0.1M Trifluoromethylsulfonic acid (HTf) in water (B&J distilled in glass). Polymer coated electrodes were prepared by dip-coating or spin-coating the carbon electrode with a dispersion of ionomer which also contained the catalyst and mediator in appropriate concentrations. The dispersion could also contain carbon support particles to approximate the structure of the MEA in voltammetry.

Catalyst Ink and MEA Preparation 0.05 g carbon powder was hydrated by several drops of isopropyl alcohol (IPA) and mixed with 0.149 g 3M 737 PFSA and subsequently with (M)TMPyP $Cl_5$ (M=Fe, Co, Mn), and hydroxymethylferrocene with molar ratio values of ionomer to catalyst 5.5:1 or 2.75:1 sulfonic acid groups to catalyst molecule, and a catalyst to mediator 1:1 molecular ratio, and 5 g IPA, with sonication for around 10 minutes. Rheological properties of the resulting ink dispersions were measured by means of a Haake MARS Rheometer in order to provide reproducibility criteria. The catalyst ink obtained was sprayed onto four membranes (Nafion® NRE212) as with a CoTMPyP $Cl_5$ loading of 0.67 or 1.34 mg-$_{cat}$/$cm^2$. It was found that use of a vacuum table to hold the membrane in place during spraying and to rapidly remove solvent led to much improved electrode layers that minimized cracking and improved reproducibility. The obtained sprayed catalyzed membrane (cathode side), together with the GDL and the anode Pt/C GDE electrode (0.3 mg-$_{Pt}$/$cm^2$), were hot-pressed at 145° C. for 4 min with a load of 1000 pounds for active 5 $cm^2$ MEA. The catalyst molar loading values used, 0.73 to 1.47 μmol-$_{cat}$/$cm^2$ (mass loading of 0.67 and 1.34 mg-$_{cat}$/$cm^2$) in the molecular catalysis electrode approach the Pt molar loading of 1.28 μmol-$_{Pt}$/$cm^2$ (mass loading of 0.25 mg-$_{Pt}$/$cm^2$) of conventional Pt-based electrodes. For the reference Pt cathode MEA, the anode was as above, and the cathode was a commercial Pt/C GDE electrode with a loading of 0.25 mg Pt/$cm^2$.

Single Cell Evaluation and Impedance Analysis

Temperature, pressure, and relative humidity were controlled using a fuel-cell test system (Model 850E, Scribner Associates Inc.). The single cell was operated under $H_2$/$O_2$ at 80° C. full humidity and 0.1 and 0.2 L/min and 10 and 15 psig for anode and cathode flow rate, and back pressure, respectively. The testing protocol was: open circuit (OCV) with full humidity for 2 hours; 3 voltage polarization scans; 15 minutes each at steady state currents of 200, 150, 100, 75, 50, and 30 mA/$cm^2$ while Electrochemical Impedance Spectroscopy (EIS) data was obtained; finally a last polarization voltage scan was recorded. Impedance analysis was conducted using the integrated high frequency resistance (HFR) system in the Scribner fuel-cell test system.

Electron Microscopy

To analyze the MEAs, scanning electron microscopy (SEM, JEOL 6360LV, Japan) and transmission electron microscopy (TEM, JEOL 2100F) were used. The cross-sectional MEA sample for SEM was prepared under liquid nitrogen, and analyzed without gold coating. The TEM was operated at 200 kV.

Results and Discussion

Molecular Catalysis

FIG. 2 shows the cyclic voltammetry of the Fe(III) TMPyP at a glassy carbon electrode in 0.1M HTf in the presence and absence of oxygen. The Fe(III)/(II) couple shows a simple process that is both chemically and electrochemically reversible in the absence of oxygen. The presence of oxygen leads to a large increase in the reduction current and a loss of the reverse oxidation peak consistent with a chemical reaction of the Fe(II)TPyP with oxygen that is catalytic in nature with respect to the FeTMPyP since the current increase corresponds to multiple electron equivalents per FeTMPyP molecule. Direct reduction of oxygen on the bare glassy carbon electrode occurs at potentials negative of –0.3V vs. Ag/AgCl which indicates that the reduction of oxygen is catalytic in terms of voltage as has been reported previously many times. Similar measurements with Co(III)TMPyP, Mn(III)TMPyP and Cu(II)TMPyP complexes are less straightforward. Co(III)TMPyP exhibits a voltammetric reduction peak which is consistent with slow electron transfer, while the reverse oxidation peak is consistent with a fast process. Mn(III) exhibits two reduction peaks, whose relative heights are sweep-rate dependent while there is only one oxidation peak. This behavior is consistent with the presence of different species that are in equilibrium with each other. The Cu(II)TMPyP exhibits reduction and oxidation peaks that are consistent with adsorption on the electrode.

FIG. 3 displays the rotating ring disk voltammetry at a glassy carbon disk and Pt ring electrode for Fe(III) and Co(III) TMPyP complexes in 0.1M HTf in the presence of oxygen. The current measured at the ring electrode is traditionally a measure of the concentration of hydrogen peroxide formed at the disk electrode, but in this case the current may also be due to M(II)TMPyP species and other intermediate M(II)TMPyP—$O_2$ adducts in addition to free $H_2O_2$. The onset potential for the Co complex is 200 mV positive of that of the Fe complex but the ring currents are much larger indicating the formation of peroxide or peroxy complexes. This is consistent with the observed slow electron transfer in cyclic voltammetry to the Cobalt complex resulting in incomplete reduction. The incomplete reduction of the oxygen during catalysis with the MTPyP complexes complicates the quantitative treatment of the catalysis according to methods such as redox catalysis described by Saveant et al(7, 11-13). Nevertheless, assuming a two electron/oxygen process during the experiment, rate constants can be measured for the outer-sphere electron transfer reaction of the reduced (M)TMPyP complexes with oxygen.

The logarithm of the rate constants are plotted for each complex against the reduction potential versus NHE in FIG. 4. In spite of the non-ideality of the voltammetric responses and the incomplete reduction observed in RRDE, a remarkably linear relationship is observed. However, a further inconsistency arises from the measured reaction rates which are too high to be consistent with an outer-sphere electron transfer mechanism. The E° for superoxide is variously reported to be less than −0.1 V vs. NHE and this value is inconsistent with the rates of reaction measured here. An alternative mechanism therefore involves some form of potential dependent inner-sphere complex formation that does not produce free superoxide. This is similar to a form of redox catalysis described by Saveant et al.(14) for $CO_2$ reduction, but the exact scheme is still under investigation.

FIG. 4 illustrates a further problem with these catalyst complexes in that the redox potentials are much too low to be competitive with platinum. Even with a very rapid reaction with oxygen one can only expect a 200 to 300 mV positive shift in the onset potential. The thermodynamic reduction potential of $O_2$ to water is 1.23V so there is much scope for improvement. One approach is to modify the complexes with electron withdrawing groups such as $CF_3$, CN or $NO_2$ to shift the potential in the positive direction. However, as the potential is moved in the positive direction the rate of reaction with oxygen decreases, which is not desirable. In this case the electron-withdrawing effect of the substituents reduces the electron density on the metal center which has the effect of moving the potential in the positive direction but the lower electron density also results in slower reaction of the oxygen.

The rate of reduction can also be inhibited by slow electron transfer at the electrode due to electronic factors such as with Co or geometric changes in the ligand. This can be alleviated by the use of mediators which undergo rapid electron transfer at the electrode and pass on the electrons to the catalyst complexes in solution (see FIG. 1). In fact, it turns out that the mediation can help the catalysis occur at more positive voltages as is shown in 5.

FIGS. 5(a) and (b) show the redox potential of the catalyst and the onset potential under oxygen. Upon addition of the water soluble ferrocene the onset potential is shifted positively by nearly 200 mV FIG. 5(c). The currents shown in FIG. 5(c) for the ferrocene are higher than for the ferrocene alone in the absence of $O_2$. One can see that the efficiency of the catalysis is not complete under these conditions and will require optimization of the conditions to favor the bimolecular processes involved.

Polymer-coated Catalytic Electrodes

To incorporate the catalysts into an MEA electrode, the catalysts and mediators are mixed into a dispersion of ionomer such as Nafion® and then carbon-support material is added—for electron conduction and polymer-coated catalyst dispersion—to prepare an electrode ink for MEA preparation. Before examining MEA performance and variables, this ink can be tested to examine its intrinsic activity by drop-casting or spin-coating the ink onto a glassy carbon electrode. Voltammetry was performed on this electrode in a solution of 0.1M HTf with the solution under argon and oxygen as shown in FIG. 6. In this case, the Fe(III)TMPyP complex and hydroxymethylferrocene were added to the Nafion® dispersion in IPA/water. The voltammetry under argon shows almost no response for the FeTMPyP complex, which is consistent with it being immobile in the polymer layer and not accessible to the electrode. The ferrocene, however, shows two couples in the freshly prepared electrode, the less positive of which corresponds to the free hydroxymethylferocene. The second, more positive couple shows reversibility and is consistent with the formation of an electron-withdrawing ester group by reaction of the alcohol with the sulfonic acid of the Nafion®. Such a reaction seems to be most surprising and the true nature of this is being further studied. However, it is also noted that the more positive peak grows with time as is shown by the voltammogram of the electrode after two days immersion in the acid solution and it is even more noteworthy that the mediator does not leach out.

FIG. 6(b) shows the voltammetry of the electrode under oxygen. The freshly prepared electrode shows strong catalysis at the less positive potential as shown by the increase in the current over the current in the absence of oxygen and very little current for oxygen reduction directly via the FeTMPyP catalyst. The voltammetry of the aged electrode shows catalytic activity for the FeTMPyP and little if any catalysis through the reacted ferrocene, indicating that the mediation is not effective at this potential difference with the FeTMPyP catalyst. This behavior is in accord with the operation of outer-sphere redox catalysis described by Saveant et al(11-13). The strong catalysis observed for the less positive ferrocene couple arises from the high local concentrations of mediator and catalysts in the polymer layers, which would be expected to favor catalysis as has been modeled in the past(5, 6).

The voltammetry studies demonstrate the feasibility of the polymer-coated electrodes in principle, and the next step is to examine the performance of catalysts and mediators in MEAs. As noted, the formulated inks are made unto MEAs using traditional processing, with a typical gas-diffusion electrode containing Pt/C used for the anode. Micrographs of these MEAs are shown in FIG. 7, where it is clearly evident that the ionomer is dispersed in the electrode ink as ball-like particles and one can possibly detect the incorporation of the molecular catalysts on the surfaces of the ionomer particles. FIG. 7 right shows that the thickness of the molecular-catalysis electrode after hot-pressing is around 15 to 20 µm. All of the catalyst layers of the electrodes were designed at this fixed thickness based on the assumption of a volume dominant effect of ionomer on the catalyst-layer thickness.

MEA inks utilized lower equivalent weight ionomer solutions (a gift from 3M Company) than typically used in fuel cells (737 vs. 1100 g/mol, respectively). Similarly, both single-walled carbon nanotubes and a mixture of black-pearl carbon and single-walled carbon nanotube were used as support materials for the current collectors. Apparently the black pearl provides high surface area (1500 $m^2$/g) which promoted favorable surface interactions with the ionomer, thus resulting in a more uniform distribution and higher current density. The carbon nanotubes appear to allow better electronic connectivity at the mesoscale as seen in FIG. 7. Hence, a hybrid or mixture of both allow for both benefits to be realized, and could allow for more stable performance. For catalyst, from FIG. 4, cobalt is used for the metal center as it provides good activity and the best onset potential. Finally, it should be noted that all of the MEAs used a mediator since without one the performance decayed severely in the matter of a few testing cycles.

When examining the MEA performance, one critical aspect to explore is the loading of the molecular catalyst both within the redox-polymer film as well as the film thickness itself. The effect of the film thickness is shown in FIG. 8, where the loading is a direct correspondence of film thickness. According to the literature(5), the increase in the ionomer film thickness could promote ORR catalytic activity and corresponding fuel-cell performance. FIG. 8a shows that the optimized ionomer film thickness on carbon was determined at a mass ratio of ionomer to carbon I/C=0.6, very similar to that of a conventional Pt-based catalyst layer. FIG. 8b shows the respective impedance analysis, indicating that the charge-transfer-resistance trend is consistent with that of the polarization curves in FIG. 8a. Therefore, the optimized I/C ratio in our novel molecular catalysis fuel-cell system is determined to be 0.6. As described in the appendix, the model of the ionomer-film thickness effect showed that optimum is due to the tradeoff between reaction rate and transport phenomena, with thin films leading to low reaction rate and fast transport properties under reaction control, and thick films leading to high reaction rates and slow transport under transport control.

For examining catalyst loading, FIG. 9 shows polarization curves for different samples, including the best performance achieved with these molecular catalyst electrodes. As shown in the figure, the variation of the catalyst density could increase the potential. The OCV increases 20 mV upon an increase of the loading from 0.67 to 2.64 $mg_{cat}/cm^2$, but decreases 300 mV with a 40-fold lower catalyst loading (not shown here). Better dispersion of the catalysts in the ionomer in the electrode ink could also accommodate higher catalyst loading and this may be accomplished by use of different solvents in the electrode ink formulations. The molecular electrode with a catalyst loading of 1.32 $mg_{cat}/cm^2$ outperforms those with low loading. Through variation of carbon and catalysts, using the CoTMPyP cathode catalyst, an OCV of 0.728 V was obtained, relative to 0.412 V of blank carbon, and a maximum/short-circuit current density of 1280 $mA/cm^2$ is achieved, approaching the same magnitude of current density of conventional Pt-based electrode, as shown in FIG. 9. Incidentally, the control OCV experiments with blank carbon electrodes show that cross-contamination of platinum from the anode to the cathode does not occur at least on the time-scale of the presently described experiments. Further MEA structure optimization and chemistry to tune catalyst and mediator structure is necessary and is currently ongoing.

To explore that optimization and understand operating tradeoffs, mathematical modeling of the electrode structure was accomplished, where the detailed descriptions including the validation and parameters used are given in the Appendix. As noted above, the model allowed one to explain the observed data. In addition, the model was used to explore the impact of the various transport and kinetic parameters that are believed to be limiting including the redox polymer-film thickness; and the results are shown in FIG. 10. From the experimentally best achieved performance (see FIG. 9), incremental improvements can be further obtained from optimal geometry, reaction rate, and transport parameters as summarized in Error! Reference source not found.

In Design #1, the redox-polymer thickness significantly increases the molecular-catalyst loading, and this yields double the current density for a given potential (E=0.3 V). However, the performance is still limited by the other parameters, e.g., proton conductivity and oxygen reduction reaction rate. In addition to Design #1, an order of magnitude increase in the proton conductivity and oxygen reduction reaction rate results in current enhancement by nearly factor of two (Designs 2 and 3). An additional 10-fold reaction rate (Design 4) increase does not improve the current density, which implies that the reaction rate is not rate limiting for this design. With a 100 fold reaction rate increase including oxygen and electron transport in the redox polymer (Designs 5 and 6), the performance increase is negligibly small, indicating that oxygen and electron transport are not limiting. The formal potential increase through the mediator in the redox polymer and the 10-fold reaction rate increase yield a significant reduction of the overpotential, and in turn result in the significant performance improvement, especially at low current density. Another order of magnitude reaction rate increase is expected to increase the current density by a factor of two at a given potential (E=0.6 V). As discussed, step-change performance gains can be predominantly achieved by improved catalyst chemistry in combination with mediators. It should be noted though, that the MEA design and polymer-coated electrodes are viable frameworks for 3D molecular catalysis and can achieve rates comparable with traditional Pt-based electrodes. Thus, this is a good framework to test and realize new molecular catalysis.

Conclusions

The experiments described here demonstrate that the concept of a three-dimensional array of molecular catalysts dispersed in the binder ionomer of an MEA electrode is a viable method of mounting and using homogeneous electrocatalysts. The current densities that have been achieved are compatible with fuel cell use. Although the lifetime attained to date has been modest this has been due to lack of long-term testing rather than degradation. The turnover frequencies obtained for the molecular catalysts are at least comparable with that of platinum group metal catalysts and the three dimensional array successfully compensates for the large size of the catalyst to allow the support of high current densities.

The voltages achieved for the catalysts in the MEAs are considerably poorer than that of platinum but are entirely consistent with the behavior of the catalysts in homogeneous solution experiments such as cyclic voltammetry. The progression from electroanalytical experiment to full scale fuel cell platform has been demonstrated and the chemistry observed in voltammetry has translated well in the MEA. Most importantly, the models of the electrode behavior have predicted the experimental results surprisingly well and provide very useful tools for future optimization. The poor voltage behavior for the oxygen catalysts is completely consistent with the intrinsic redox potentials and kinetics of the homogeneous catalysts and the major improvements that are necessary will come from modifications to the catalyst structure and reactivity. The experiments described here show that these improvements can be carried out in a logical, science-based fashion using classical electroanalytical methods and those results can be directly translated into the fuel cell technology platform for practical implementation.

The mathematical model employs a previous multiscale approach(15), including the mesoscopic models(5, 6) for the redox polymer and the macroscopic model for scale-up. The mathematical model is developed based on the descriptions on the characteristic behaviors of the electron, proton, and oxygen (see FIG. 1).

For modeling the mesoscopic scale of the electrochemical reaction, a simple mechanism is employed(11-13).

(A.1)

(A.2)

(A.3)

where P is the original form of molecular catalyst, e.g., Fe(III)TMPyP$^{5+}$, e$^-$ is the electron, Q is the reduced form, e.g., Fe(II)TMPyP$^{4+}$, S is the substrate (here, substrate is oxygen molecules), B is the product, and $k_1$ is the reaction rate. Generally, the reaction begins with single electron transfer, but here, we consider multiple electron mechanism postulating that the overall reaction rate is limited by the step (A.2) at rate of $k_1$. The electron and substrate (oxygen molecules) are considered as diffusive transport, i.e., Fickian diffusion, and the local concentration of the species are given as $$D_e \frac{d^2 c_P}{dr^2} + nk_1 c_A c_Q = 0 \quad (A.4)$$

$$D_e \frac{d^2 c_Q}{dr^2} + nk_1 c_S c_Q = 0 \quad (A.5)$$

$$D_S \frac{d^2 c_S}{dr^2} + nk_1 c_S c_Q = 0 \quad (A.6)$$

where $c_P$, $c_Q$ are the concentrations of the original and reduced forms of the molecular catalyst, respectively, $c_S$ is the concentration of the substrate (oxygen), n is the number of electrons. At r=0 (the electrode interface), it is postulated that there is no oxygen transport and the concentrations of the original/reduced forms of the catalyst are conserved, and the molecular catalyst (including mediator) is equilibrated with the electrode potential (Nernst approximation)

$$\frac{c_Q}{c_P^\circ} = \frac{1}{1 + \exp\left[\frac{nF}{RT}(E - E_M^\circ)\right]} \quad (A.7)$$

where F is the Faraday constant, R is the gas constant, T is the temperature, and E is potential and $E_M^\circ$ is the formal potential of the catalyst (here the potential is changed with the mediator). At the open pore interface (r=$L_\delta$), no electron transport occurs and the oxygen concentration is equilibrated with the oxygen concentration dissolved in the surrounding liquid-water film, which is predicted by Henry's law from the outside concentration. For the kinetics, a Tafel expression is used $$k_1 = k_o \exp(-b\eta) \quad (A.8)$$

where $k_o$ is the reaction rate at the formal potential, b is the Tafel coefficient, and $\eta$ is the overpotential. The current density $i_c$ at the electrode interface is predicted as $$i_c = -4FD_e \frac{dc_Q}{dr} \quad (A.9)$$

For the transport properties used, see Table A-1. Since the transport properties of the redox polymer are not found in the literature, Nafion® properties are used here in terms of oxygen diffusivity and solubility(16). For the electron transport, since the metal complex is expected to attach strongly to the polymer backbone and the catalytic sites are considered as being immobile, the primary transport mechanism is assumed to be hopping diffusion; the electron diffusivity in organic materials is in range of $10^{-11}$ to $10^{-8}$ cm$^2$/s, and $10^{-9}$ cm$^2$/s is chosen for the prototype.

To understand and predict transport across the catalyst layer, a macroscopic model is used that interacts with the above mesoscopic model or transport and reaction within the redox polymer film (see FIG. 1c). The issues explored include electron, proton, and oxygen transport through the carbon, PEM, and pore space, respectively. The electrochemical reaction is calculated using a Tafel expression, $$\nabla \cdot i_{H^+} = \zeta \varepsilon_{rp} S_{rp} L_\delta F k_1 c_{H^+} c_{O_2} \exp\left(\frac{\alpha_c F \eta}{RT}\right) \quad (A.10)$$

where $i_{H^+}$ is the proton current, $\varepsilon_{rp}$, $S_{rp}$, $L_\delta$ are the volume fraction, the specific surface area, and thickness of the redox polymer, respectively, $k_1$ is the reaction rate (eq. A.8), and the proton concentration is explicitly used since it may be limiting(17). For oxygen and water-vapor transport, Stefen-Maxwell diffusion is used, and the ionic and electronic potentials are determined using Ohm's law. For the reaction and transport, the catalyst layer is considered as homogeneous effective medium, where the effective transport properties are predicted by a Bruggeman relation(18). The boundary conditions for the oxygen and water are $$N_{O_2}|_{z=0} = 0, \quad (A.11)$$

$$c_{O_2}|_{z=L_{CL}} = c_{O_2,CL/GDL}$$

$$N_{H_2O}|_{z=0} = -\alpha_{eo} \frac{i_e}{F} \quad (A.12)$$

respectively. The transport properties and geometric parameters used for the model are summarized in Table A-I. At the interface between the catalyst layer and diffusion media, the oxygen and water concentration are calculated considering simple Fickian transport with Knudsen diffusion through the GDL/MPL(19-22).

Validation of the model is performed using the list of parameters (see Table A-I), and the predicted results are compared with the experimental results (sample #1 and #5) as shown in FIG. 11. The model demonstrates good agreement using the measured rate constants (see FIG. 4) and the electrode properties of 0.3, 0.43, and 0.26 volume fractions for gas, carbon, and redox-polymer, respectively, and thicknesses of the redox-polymer layer and catalyst layer of 2 nm and 15 μm, respectively.

TABLE I

Summary of the detailed specifications for the molecular catalysts explored.

| Sample | Catalyst (Loading, g/cm$^2$) | Carbon | Ionomer Carbon Ratio | Mediator |
|---|---|---|---|---|
| #1 | CoPyP (0.67) | SWCNT | 0.6 | FerrMeOH |
| #2 | CoPyP (0.67) | " | 1.2 | " |
| #3 | CoPyP (0.67) | " | 2.4 | " |
| #4 | CoPyP (0.67) | BP/SWCNT | 0.6 | FerrMeOH |

TABLE I-continued

Summary of the detailed specifications for the molecular catalysts explored.

| Sample | Catalyst (Loading, g/cm$^2$) | Carbon | Ionomer Carbon Ratio | Mediator |
|---|---|---|---|---|
| #5 | CoPyP (1.32) | " | " | " |

Catalyst/Ionomer molar ratio = 1.5
FerrMeOh/CoPyP = 1

Error! Reference source not found.

| Case # | $L_\delta$, nm ($L_{CL}$, μm) | $\sigma_{H^+}$, S/cm | $k_1$, cm$^3$/mol-s | $D_{O_2}$, cm$^2$/s | $D_e$, cm$^2$/s | $c_{rp}$, mol/cm$^3$ | $E_M°$, V |
|---|---|---|---|---|---|---|---|
| I | 10 (20) | " | " | " | " | " | " |
| II | " | 10× | " | " | " | " | " |
| III | " | " | 10× | " | " | " | " |
| IV to VI | " | " | 100× | 10× | 10× | " | " |
| VII | " | " | 10× | " | " | " | 0.8 |
| VIII | " | " | 100× | " | " | " | 0.8 |

$L_\delta$: the thickness of the redox polymer
$L_{CL}$: the thickness of the catalyst layer
$\sigma_{H^+}$: the effective proton conductivity through the redox polymer in the catalyst layer
$k_1$: the oxygen reduction rate at the molecular catalyst
$D_{O_2}$: the oxygen diffusivity in the redox polymer
$D_e$: the electron diffusivity in the redox polymer
$c_{rp}$: the molar concentration of the molecular catalyst in the redox polymer
$E_M°$: the formal potential of the mediator

TABLE A-I

Summary of the transport properties and geometries used.

| Parameters | Magnitude | Parameters | Magnitude |
|---|---|---|---|
| $^a\langle D_{O_2}\rangle$, cm$^2$/s | $2 \times 10^{-6}$ | T, °C. | 80 |
| $^c k_1$, cm$^3$/mol-s | $k_o \exp(b \times \eta)$ | $r_s$, nm | 15 |
| $D_e$, cm$^2$/s$^b$ | $1 \times 10^{-9}$ | $c_{rp}$, mol/cm$^3$ | $4.978 \times 10^{-4}$ |
| $L_\delta$, nm | 200 nm | $\sigma_e$, S/cm | 0.001 |
| H | $1.456 \times 10^{-2}$ | $\sigma_H^+$, S/cm | 0.001 |
| $L_{CL}$ | 15 μm | $E_M°$, V | 0.4 |

$^a$the original measurement was done at 5 atm and 80° C.(23), and it is corrected using $D_{ij}°(T, P) = D_{ij}°(T_1, P_1) \times P_1/P) \times (T/T_1)^{1.8}$
$^b$the electron diffusivity of the organic materials are $10^{-11}$ to $10^{-8}$ cm$^2$/s, and we chose $10^{-9}$ cm$^2$/s for the prototype design.
$^c k_o$ and b were used from the measurements (see FIG. 4 for $k_o$), and 30 V$^{-1}$ for b.

REFERENCES

1. O. Savadogo, *ChemInform*, 29, no (1998).
2. B. C. H. Steele and A. Heinzel, *Nature*, 414, 345 (2001).
3. X. Zhu, H. Zhang, Y. Zhang, Y. Liang, X. Wang and B. Yi, *J Phys Chem B*, 110, 14240 (2006).
4. Z. G. Qi and A. Kaufman, *Journal of Power Sources*, 113, 37 (2003).
5. C. P. Andrieux, J. M. Dumas-Bouchiat and J. M. Saveant, *Journal of Electroanalytical Chemistry*, 114, 159 (1980).
6. C. P. Andrieux and J. M. Saveant, *Journal of Electroanalytical Chemistry*, 93, 163 (1978).
7. J. M. Saveant, *Chemical Reviews*, 108, 2348 (2008).
8. D. N. Blauch and J. M. Saveant, *Journal Of the American Chemical Society*, 114, 3323 (1992).
9. J. B. Kerr, L. L. Miller and V. D. M. R., *Journal of the American Chemical Society*, 102, 3833 (1980).
10. Z. Siroma, R. Kakitsubo, N. Fujiwara, T. Ioroi, S.-i. Yamazaki and K. Yasuda, *Journal of Power Sources*, 189, 994 (2009).
11. C. P. Andrieux, J. M. Dumas-Bouchiat and J. M. Saveant, *Journal of Electroanalytical Chemistry*, 87, 39 (1978).
12. C. P. Andrieux, J. M. Dumas-Bouchiat and J. M. Saveant, *J. Electroanal. Chem. Interfacial Electrochem.*, 87, 55 (1978).
13. C. P. Andrieux, J. M. Dumas-Bouchiat and J. M. Saveant, *J. Electroanal. Chem. Interfacial Electrochem.*, 88, 43 (1978).
14. A. Gennaro, A. A. Isse, J. M. Saveant, M. G. Severin and E. Vianello, *Journal of the American Chemical Society*, 118, 7190 (1996).
15. W. Yoon and A. Z. Weber, *Journal of the Electrochemical Society*, 158, B1007 (2011).
16. A. T. Haug and R. E. White, *Journal of the Electrochemical Society*, 147, 980 (2000).
17. M. Eikerling and A. A. Kornyshev, *Journal of Electroanalytical Chemistry*, 453, 89 (1998).
18. C. Man and X. Li, *Journal of Power Sources*, 77, 17 (1999).
19. M. Kaviany, *Principles of Heat Transfer in Porous Media*, Springer-Verlag, New York, N.Y. (1995).
20. M. M. Mezedur, M. Kaviany and W. Moore, *Aiche Journal*, 48, 15 (2002).
21. J. H. Nam and M. Kaviany, *International Journal of Heat and Mass Transfer*, 46, 4595 (2003).
22. A. Z. Weber and J. Newman, *International Communications in Heat and Mass Transfer*, 32, 855 (2005).
23. A. Parthasarathy, S. Srinivasan, A. J. Appleby and C. R. Martin, *Journal of the Electrochemical Society*, 139, 2530 (1992).

What is claimed is:

1. A Membrane-electrode assembly (MEA) comprising a 3-dimensionally distributed array of catalysts comprising (M)meso-tetra(N-Methyl-4-Pyridyl) Porphinepentachloride (M=Fe, Co, Mn & Cu) distributed within a proton-conductive ionomer in an electrode layer.

2. The Membrane-electrode assembly (MEA) of claim 1 wherein the proton-conductive ionomer comprises perfluorosulfonic-acid (PFSA).

3. The Membrane-electrode assembly (MEA) of claim 2 further comprising a 3-dimensionally distributed array of mediators comprising hydroxymethylferrocene or dimethylaminomethyl ferrocene distributed within the proton-conductive ionomer.

4. The Membrane-electrode assembly (MEA) of claim 3 further comprising a 3-dimensionally distributed array of carbon particles distributed within the proton-conductive ionomer.

* * * * *